United States Patent
Funahashi et al.

(10) Patent No.: US 12,504,431 B2
(45) Date of Patent: Dec. 23, 2025

(54) BIOMARKERS FOR A THERAPY COMPRISING A SORAFENIB COMPOUND

(71) Applicant: Eisai R&D Management Co., Ltd., Tokyo (JP)

(72) Inventors: Yasuhiro Funahashi, Tokyo (JP); Yukinori Minoshima, Tsukuba (JP); Michio Kanekiyo, Edgewater, NJ (US); Saori Miyano, Tsukubamirai (JP); Taisuke Hoshi, Tsukubamirai (JP)

(73) Assignee: Eisai R&D Management Co., Ltd., Tokyo (JP)

( * ) Notice: Subject to any disclaimer, the term of this patent is extended or adjusted under 35 U.S.C. 154(b) by 982 days.

(21) Appl. No.: 17/282,218

(22) PCT Filed: Oct. 2, 2019

(86) PCT No.: PCT/JP2019/038995
§ 371 (c)(1),
(2) Date: Apr. 1, 2021

(87) PCT Pub. No.: WO2020/071451
PCT Pub. Date: Apr. 9, 2020

(65) Prior Publication Data
US 2021/0333281 A1   Oct. 28, 2021

Related U.S. Application Data

(60) Provisional application No. 62/741,978, filed on Oct. 5, 2018.

(51) Int. Cl.
| | | |
|---|---|---|
| *A61P 35/00* | (2006.01) | |
| *A61K 31/47* | (2006.01) | |
| *C12Q 1/6886* | (2018.01) | |
| *G01N 33/574* | (2006.01) | |

(52) U.S. Cl.
CPC ....... *G01N 33/57438* (2013.01); *A61K 31/47* (2013.01); *A61P 35/00* (2018.01); *C12Q 1/6886* (2013.01); *C12Q 2600/106* (2013.01); *C12Q 2600/158* (2013.01); *G01N 2333/50* (2013.01)

(58) Field of Classification Search
CPC .......... G01N 33/57438; G01N 2333/50; A61P 35/00; A61K 31/47; C12Q 1/6886; C12Q 2600/106; C12Q 2600/158
See application file for complete search history.

(56) References Cited

U.S. PATENT DOCUMENTS

| | | | |
|---|---|---|---|
| 5,057,313 A | 10/1991 | Shih et al. | |
| 5,156,840 A | 10/1992 | Goers et al. | |
| 5,445,934 A | 8/1995 | Fodor et al. | |
| 6,027,880 A | 2/2000 | Cronin et al. | |
| 6,057,100 A | 5/2000 | Heyneker | |
| 6,156,501 A | 12/2000 | McGall et al. | |
| 6,261,776 B1 | 7/2001 | Pirrung et al. | |
| 6,576,424 B2 | 6/2003 | Fodor et al. | |
| 6,812,341 B1 | 11/2004 | Conrad | |
| 7,101,663 B2 | 9/2006 | Godfrey et al. | |
| 7,235,576 B1 | 6/2007 | Riedl et al. | |
| 7,253,286 B2 | 8/2007 | Funahashi et al. | |
| 7,351,834 B1 | 4/2008 | Riedl et al. | |
| 7,612,208 B2 | 11/2009 | Matsushima et al. | |
| 2003/0013208 A1 | 1/2003 | Jendoubi | |
| 2004/0086915 A1 | 5/2004 | Lin et al. | |
| 2004/0171068 A1 | 9/2004 | Wehland et al. | |

FOREIGN PATENT DOCUMENTS

| | | |
|---|---|---|
| EP | 0543942 | 1/2001 |
| WO | WO 2016/167306 | 10/2016 |
| WO | WO 2018/212202 A1 | 11/2018 |

OTHER PUBLICATIONS

R.S. Finn et al. 59PD—Final analysis of serum biomarkers in patients (pts) from the phase III study of lenvatinib (LEN) vs sorafenib (SOR) in unresectable hepatocellular carcinoma (uHCC) [REFLECT], Annals of Oncology, vol. 29, Supplement 8, 2018, pp. viii17-viii18, (Year: 2018).*
Hsu et. al. Artificial intelligence based on serum biomarkers predicts the efficacy of lenvatinib for unresectable hepatocellular carcinoma. Am J Cancer Res. Dec. 15, 2022;12(12):5576-5588. (Year: 2022).*
Cancer.gov. https://www.cancer.gov/about-cancer/treatment/drugs/lenvatinibmesylate ("NIH") (Year: 2015).*
Rainen et al. (2002). Stabilization of mRNA expression in whole blood samples. Clinical Chemistry, 48(11), 1883-1890. (Year: 2002).*
Llovet et al. Sorafenib in advanced hepatocellular carcinoma. N Engl J Med. Jul. 24, 2008;359(4):378-90. (Year: 2008).*
R.S. Finn et al. LBA30—Analysis of serum biomarkers (BM) in patients (pts) from a phase 3 study of lenvatinib (LEN) vs sorafenib (SOR) as first-line treatment for unresectable hepatocellular carcinoma (uHCC), Annals of Oncology, vol. 28, Supplement 5, 2017, p. v617, (Year: 2017).*
Kaibori et al., "Increased FGF19 copy number is frequently detected in hepatocellular carcinoma with a complete response after sorafenib treatment," Oncotarget, Jun. 15, 2016, 7(13):49091-49098.
Office Action in European Patent Application No. 19790311.5, dated Feb. 21, 2024, 7 pages.

(Continued)

*Primary Examiner* — James H Alstrum-Acevedo
*Assistant Examiner* — Pierre Paul Eleniste
(74) *Attorney, Agent, or Firm* — Fish & Richardson P.C.

(57) ABSTRACT

Biomarkers are provided that predict whether a subject having a hepatocellular carcinoma is responsive to a therapy comprising sorafenib or a pharmaceutically acceptable salt thereof. The biomarkers, compositions, and methods described herein are useful in selecting appropriate treatment modalities for and treating a subject having, suspected of having, or at risk of developing a hepatocellular carcinoma.

12 Claims, 4 Drawing Sheets

(56) References Cited

OTHER PUBLICATIONS

Office Action in Japanese Patent Application No. P2021-518200, dated Feb. 27, 2024, 8 pages (with English Translation).
Liu et al., "Clinicopathologic Characterization of Sorafenib-induced Endoplasmic Reticulum Stress in Human Liver Cancer Cells," Journal of Physiology and Pharmacology, Aug. 2018, 69(4):1-5.
Office Action in Japanese Patent Application No. 2021-518200, dated Oct. 17, 2023, 8 pages (with English Translation).
Notice of Allowance in European Patent Application No. 19790311.5, dated Aug. 6, 2024, 41 pages.
Submission Document in European Patent Application No. 19790311.5, dated Jun. 19, 2024, 56 pages.
[No Author Listed], "Current Protocols in Immunology", Cover Page with Table of Contents for pp. 2.4.1-14.8.9, Wiley, Mar. 1995, vol. 13, Issue 1, 3 pages.
Addona et al., "Multi-site assessment of the precision and reproducibility of multiple reaction monitoring-based measurements of proteins in plasma," Nature Biotechnology, Jul. 2009, 27(7):633-641.
Burtis et al., "Tietz Textbook of Clinical Chemistry," 3rd ed., Cover Page with Table of Contents, Saunders, 1999, 21 pages.
Eisenhauer et al., "New response evaluation criteria in solid tumours: revised RECIST guideline (version 1.1), " European Journal of Cancer, 2009, 45:228-247.
Finn et al., "Analysis of serum biomarkers (BM) in patients (pts) from a phase 3 study of lenvatinib (LEN) vs sorafenib (SOR) as first-line treatment for unresectable hepatocellular carcinoma (uHCC)," 2nd ESMO Congress, ESMO 2017, Annals of Oncology, Sep. 2017, 28(Supplemental 5):617, XP055664103.
Finn et al., "Final analysis of serum biomarkers in patients (pts) from a phase III study of lenvatinib (LEN) vs sorafenib (SOR) in unresectable hepatocellular carcinoma (uHCC) [REFLECT]," Abstract, 43rd Congress of European Society for Medical Oncology, ESMO 2018, Annals of Oncology, Oct. 2018, 29(Supplemental 8):pviii17-pviii18, XP055664102.
Finn et al., "Final analysis of serum biomarkers in patients from the phase 3 study of lenvatinib (LEN) vs sorafenib (SOR) in unresectable hepatocellular carcinoma (uHCC) [REFLECT]," Abstract #380, 28th Annual Conference of Asian Pacific Association for the Study of the Liver, APASL 2019, Hepatology International, Feb. 2019, 13(Supplemental 1):S168, XP055664317.
Gibson et al., "A Novel Method for Real Time Quantitative RT-PCR," Genome Research, 1996, 6:995-1001.
Harlow et al., "Antibodies: A Laboratory Manual," Cover Page with Table of Contents, Cold Spring Harbor Laboratory Press, 1988, 9 pages.
Harlow et al., "Using Antibodies: A Laboratory Manual", Cover Page with Table of Contents, Cold Spring Harbor Press, 1999, 5 pages.
Huston et al., "Protein engineering of antibody binding sites: Recovery of specific activity in an anti- digoxin single-chain Fv analogue produced in *Escherichia coli*," Proceedings of the National Academy of Sciences, Aug. 1988, 85:5879-5883.
Ikeda et al., "Chemotherapy for hepatocellular carcinoma: current status and future perspectives," Japanese Journal of Clinical Oncology, 2018, 48(2):103-114.
Kuzyk et al., "Multiple Reaction Monitoring-based, Multiplexed, Absolute Quantitation of 45 Proteins in Human Plasma," Molecular & Cellular Proteomics 8.8, 2009, 8:1860-1877.
Matsuki et al., "Abstract 1805: Antitumor Activity of Lenvatinib Mesilate in Human Hepatocellular Carcinoma Preclinical Models," Proceedings of the American Association for Cancer Research Annual Meeting 2017; Apr. 1-5, 2017; Washington DC, 77(13 Supplement), 4 pages.
Matsuki et al., "Antitumor Activity of Lenvatinib Mesilate in Human Hepatocellular Carcinoma Preclinical Models," Presentation No. 1805, Eisai Co., Ltd., Tsukuba, Ibaraki, Japan, Apr. 2017, 1 page.
Miyano et al., "Distinct relationship of antitumor activity of lenvatinib (LEN) and sorafenib (SOR) to FGF21 expression levels in preclinical hepatocellular carcinoma (HCC) models," Abstract Poster Session, 30th EORTC-NCI-AACR Symposium, Dublin, Ireland, European Journal of Cancer, Nov. 13-16, 2018, 103(Supplemental 1):e39, XP05566428.
Paulovich et al., "The interface between biomarker discovery and clinical validation: The tar pit of the protein biomarker pipeline," Manuscript, Proteomics Clinical Applications, Oct. 2008, 2(10-11):1386-1402.
PCT International Search Report and Written Opinion in International Appln. No. PCT/JP2019/038995, dated Feb. 10, 2020, 10 pages.
Sambrook et al., "Molecular Cloning: A Laboratory Manual Second Edition vol. 1, 2 and 3," Cover Page with Table of Contents, Cold Spring Harbor Laboratory Press, 1989, 30 pages.
Zhang et al., "Quantitative RT-PCR Methods for Evaluating Toxicant-Induced Effects on Steroidogenesis Using the H295R Cell Line," Environmental Science & Technology, 2005, 39(8):2777-2785.
Submission Document in European Patent Application No. 19790311.5, dated Nov. 10, 2021, 10 pages.
Ausubel et al., "Chapter 7: DNA Sequencing," Current Protocols in Molecular Biology, John Wiley & Sons, 1999, Supplement 47:7.0.1-7.0.15.
Notice of Opposition in European Patent Application No. 19790311.5, dated Oct. 14, 2025, 23 pages.
Opposition, "Annex 1 Summary of Product Characteristics issued by EMA," Exhibit HW5 in European Patent Application No. 19790311.5, mailed on Oct. 14, 2025, 34 pages.
Opposition, "Assessment report Lenvima, EMA/250082/2015, Mar. 26, 2015," Exhibit HW6 in European Patent Application No. 19790311.5, mailed on Oct. 14, 2025, 169 pages.
Opposition, "Kudo, 'Lenvatinib May Drastically Change the Treatment Landscape of Hepatocellular Carcinoma,' Liver Cancer, Feb. 2018, 7:1-19," Exhibit HW4 in European Patent Application No. 19790311.5, mailed on Oct. 14, 2025, 19 pages.
Opposition, "Yang et al., 'Activation of Liver FGF21 in hepatocarcinogenesis and during hepatic stress,' BMC Gastroenterology, Apr. 2013, 13(67):1-14," Exhibit HW2 in European Patent Application No. 19790311.5, mailed on Oct. 14, 2025, 14 pages.

\* cited by examiner

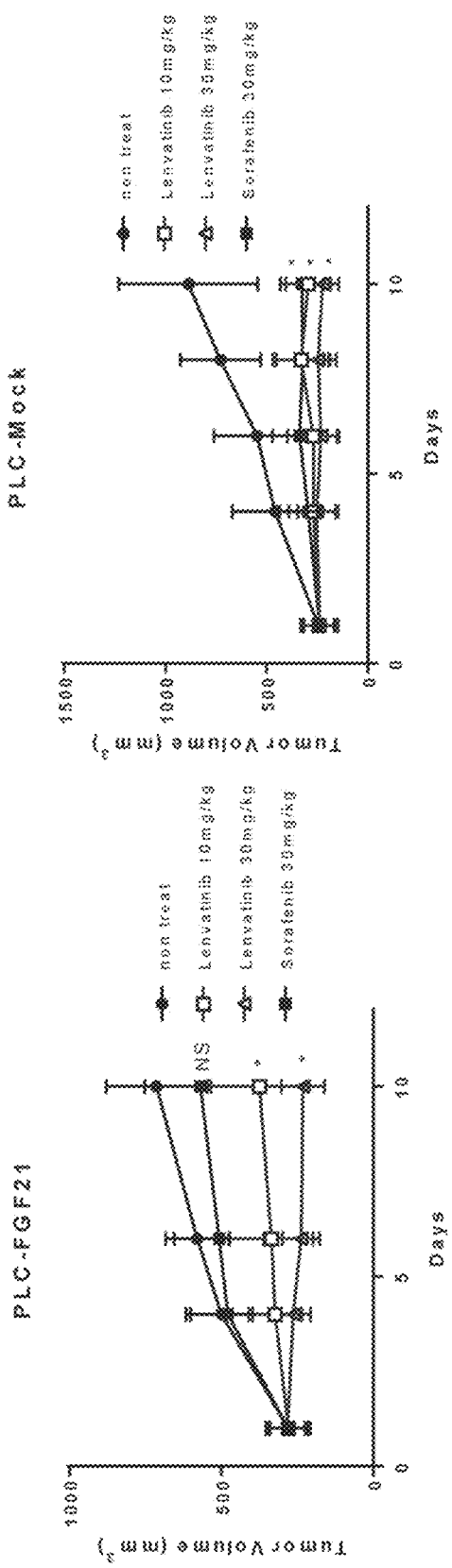
[Fig. 1]

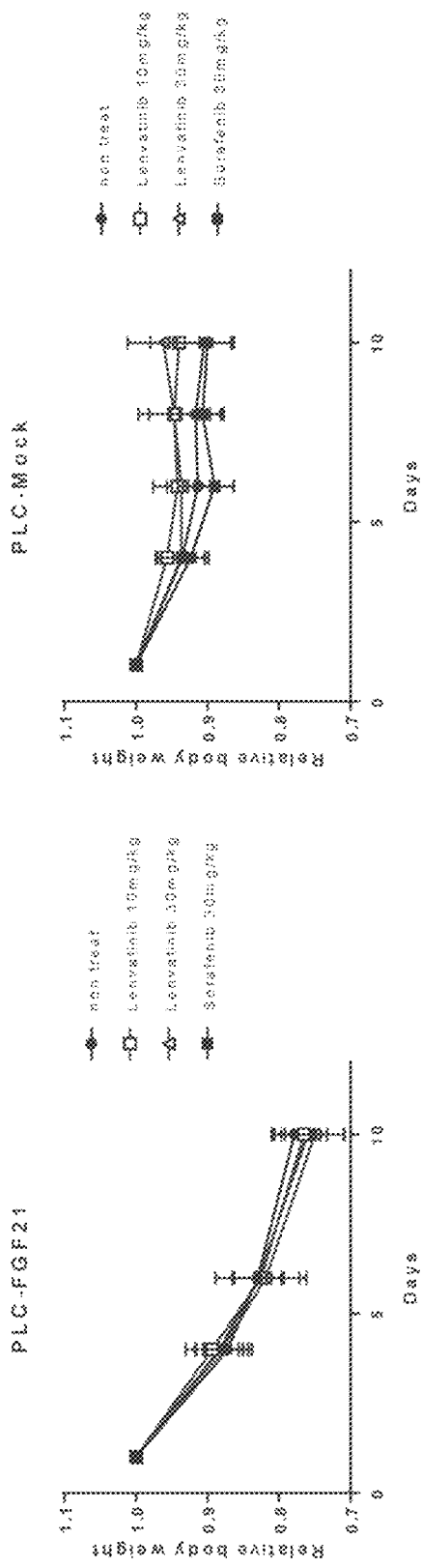
[Fig. 2]

[Fig. 3]
IHC in HCC PDx model (LI0334)
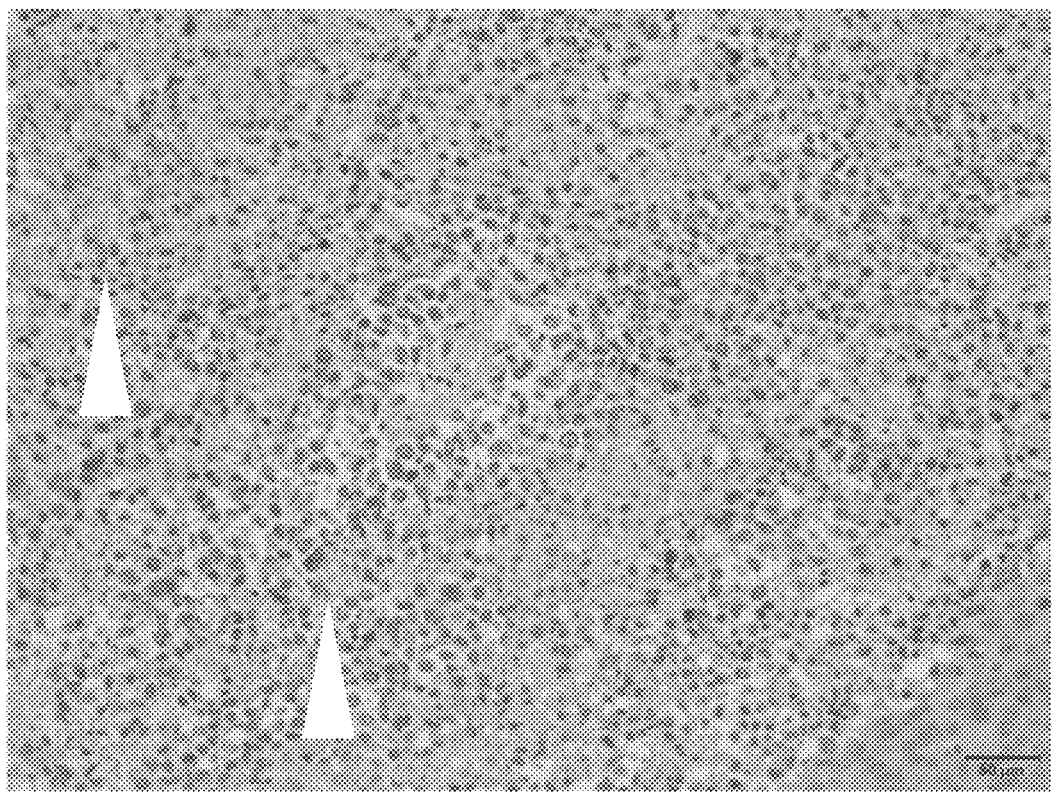

[Fig. 4]
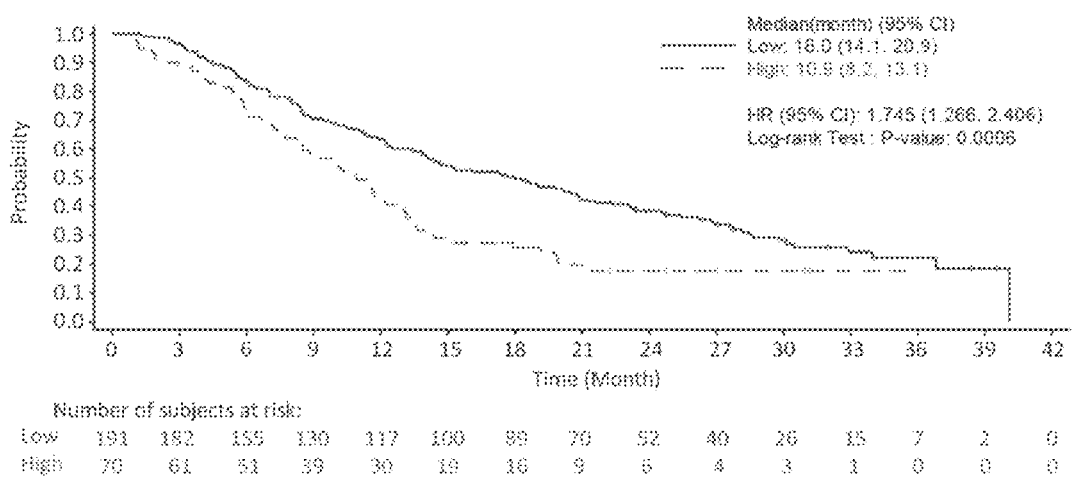
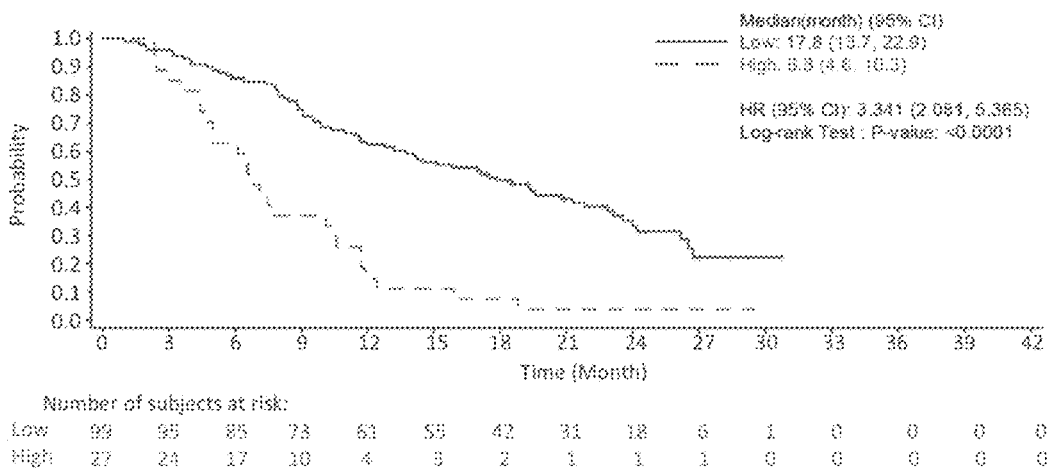

BIOMARKERS FOR A THERAPY COMPRISING A SORAFENIB COMPOUND

TECHNICAL FIELD

The present invention relates generally to biomarkers and hepatocellular carcinoma.

Background Art

Hepatocellular carcinoma (HCC) is the most common type of liver cancer, which is the third leading cause of cancer deaths worldwide. The disease usually occurs in people with chronic liver disease, particularly cirrhosis, which limits the feasibility of surgical resection.

Sorafenib is a multikinase inhibitor of Raf kinase, which is known to be involved in cancer cell proliferation, and also of vascular endothelial growth factor receptor-2/-3 (VEGFR-2/-3) and platelet derived growth factor receptor-beta (PDGFR-β), which are known to be involved in peritumor neovascularization. Sorafenib tosylate has been approved as NEXAVAR (registered trademark) by the U.S. Food and Drug Administration for the treatment of patients with hepatocellular carcinoma, renal cell carcinoma, and certain types of thyroid carcinoma. Sorafenib is established as the standard therapy treatment agent for first-line therapy of patients with advanced HCC, and is available worldwide.

Most anti-tumor treatments are associated with undesirable side effects, such as profound nausea, vomiting, or severe fatigue, which need to be controlled. Also, while anti-tumor treatments have been successful, they do not produce significant clinical responses in all patients who receive them, resulting in undesirable side effects, delays, and costs associated with ineffective treatment. Therefore, biomarkers that can be used to predict the response of a subject to an antitumor agent, prior to administration thereof are greatly needed.

SUMMARY OF INVENTION

The present application is based, at least in part, on the identification of biomarkers that can be used to identify or select a human subject having, suspected of having, or at risk of developing, a hepatocellular carcinoma not responsive to a therapy comprising sorafenib or a pharmaceutically acceptable salt thereof (e.g., sorafenib tosylate). The expression level of fibroblast growth factor 21 ("FGF21") in a biological sample obtained from the human subject prior to treatment ("baseline level") is identified as a useful predictor of a human subject having, suspected of having, or at risk of developing, a hepatocellular carcinoma not responsive to a therapy comprising sorafenib or a pharmaceutically acceptable salt thereof (e.g., sorafenib tosylate). Thus, the biomarkers and compositions described herein are useful, for example, in identifying, stratifying, and/or selecting a patient or a subset of patients having hepatocellular carcinoma that would not benefit from a therapy comprising sorafenib or a pharmaceutically acceptable salt thereof (e.g., sorafenib tosylate). In addition, the methods described herein are useful, for example, in selecting appropriate treatment modalities (e.g., therapy comprising sorafenib or a pharmaceutically acceptable salt thereof (e.g., sorafenib tosylate) or an alternative hepatocellular carcinoma therapy, e.g., therapy comprising anti-tumor agent other than sorafenib or a pharmaceutically acceptable salt thereof) for a subject suffering from, suspected of having, or at risk of developing a hepatocellular carcinoma.

In one aspect, the disclosure provides a method of identifying a human subject having, suspected of having, or at risk of developing, a hepatocellular carcinoma not responsive to a therapy comprising sorafenib or a pharmaceutically acceptable salt thereof. The method involves assaying a biological sample obtained from the subject before administration of the therapy and determining that the expression level of FGF21 (e.g., FGF21 protein or mRNA encoding FGF21) in the biological sample is high, as compared to a control. The subject having a high expression level of FGF21 (e.g., FGF21 protein or mRNA encoding FGF21) in the biological sample is predicted as not responsive to the therapy comprising sorafenib or a pharmaceutically acceptable salt thereof.

In a second aspect, the disclosure features a method of excluding a human subject having, suspected of having, or at risk of developing, a hepatocellular carcinoma from administration of a therapy comprising sorafenib or a pharmaceutically acceptable salt thereof. The method comprises assaying a biological sample obtained from the human subject for the baseline level of FGF21 (e.g., FGF21 protein or mRNA encoding FGF21). If it is determined that the baseline level of FGF21 (e.g., FGF21 protein or mRNA encoding FGF21) in the biological sample is high, as compared to a control, the subject will be excluded from administration of a therapy comprising sorafenib or a pharmaceutically acceptable salt thereof. In certain embodiments, the method further comprises administering to the human subject a therapy comprising an anti-tumor agent other than sorafenib or a pharmaceutically acceptable salt thereof.

In a third aspect, the disclosure provides a method of treating a hepatocellular carcinoma. The method involves providing a biological sample obtained from a human subject having hepatocellular carcinoma before the treatment; measuring, in the biological sample, an FGF21 expression level (e.g., FGF21 protein or mRNA encoding FGF21) that is high as compared to a control; and administering to the human subject a therapeutically effective amount of an anti-tumor agent other than sorafenib or a pharmaceutically acceptable salt thereof.

In a fourth aspect, the disclosure provides a method of treating a hepatocellular carcinoma. The method involves administering to a human subject that has a hepatocellular carcinoma a therapeutically effective amount of an anti-tumor agent other than sorafenib or a pharmaceutically acceptable salt thereof, wherein the human subject has been identified as having an FGF21 expression level (e.g., FGF21 protein or mRNA encoding FGF21) that is high as compared to a control. In certain embodiments, the human subject has been identified as having a high expression level of FGF21 (e.g., FGF21 protein or mRNA encoding FGF21) in a biological sample obtained from the human subject.

In a fifth aspect, the disclosure features a method of treating a human subject having, suspected of having, or at risk of developing, a hepatocellular carcinoma. The method involves administering to the human subject a therapy comprising an anti-tumor agent other than sorafenib or a pharmaceutically acceptable salt thereof, wherein the human subject has been previously determined to have a baseline expression level of FGF21 (e.g., FGF21 protein or mRNA encoding FGF21) in a biological sample obtained from the human subject that is higher than a control.

The following embodiments are envisaged for all of the above aspects.

In one embodiment the soratenib or a pharmaceutically acceptable salt thereof is sorafenib tosylate.

In one embodiment, the anti-tumor agent other than sorafenib or a pharmaceutically acceptable salt thereof comprises any one or more anti-tumor agents selected from the agents which are or can be used for the treatment of hepatocellular carcinoma. In one embodiment, the anti-tumor agent other than sorafenib or a pharmaceutically acceptable salt thereof is any one or more anti-tumor agents selected from but not limited to, a sunitinib compound, a brivanib compound, a linifanib compound, an erlotinib compound, a doxorubicin compound, a lenvatinib compound, a brivanib compound, an everolimus compound, ramucirumab, S-1, ADI-PEG20, a tivantinib compound, a regorafenib compound, a cabozantinib compound, an anti-CTLA-4 antibody (e.g. tremelimumab and ipilimumab), an anti-PD-1 antibody (e.g., nivolumab and pembrolizumab) and an anti-PD-L1 antibody (e.g., durvalumab, avelumab, atezolizumab). In one embodiment, the anti-tumor agent is a sunitinib compound, a brivanib compound, a linifanib compound or a lenvatinib compound. In one embodiment, the anti-tumor agent is a lenvatinib compound. In one embodiment, the anti-tumor agent is lenvatinib mesylate. In certain embodiments, the lenvatinib compound (e.g., lenvatinib mesylate) is administered to the subject once daily at a dosage of 12 mg (baseline body weight (BW)≥60 kg) or 8 mg (baseline BW<60 kg).

When two or more anti-tumor agents other than sorafenib or a pharmaceutically acceptable salt thereof are administered to a patient as a combination therapy, the agents can be administered simultaneously, substantially simultaneously, or sequentially. In some cases, the two or more anti-tumor agents may be formulated together (e.g., into a single tablet or capsule or as a single liquid co-formulation). In other cases, the two or more anti-tumor agents are not co-formulated (e.g., they are administered as separate tablets or capsules, or as separate injections or infusions).

In one embodiment, the hepatocellular carcinoma is an unresectable hepatocellular carcinoma.

In some embodiments, the biological sample is selected from the group consisting of a blood sample, a serum sample, a plasma sample, a hepatocellular carcinoma archived tumor sample, and a hepatocellular carcinoma biopsy sample.

In some embodiments, the control is a pre-established cut-off value. In one embodiment, the pre-established cut-off value is an FGF21 protein concentration that is determined based on receiver operating characteristic (ROC) analysis or percentile analysis predicting tumor response with a higher positive predictive value compared to no cut-off, and wherein a concentration of FGF21 protein below the pre-established cut-off value is a low concentration of FGF21 and a value equal to or higher than the pre-established cut-off value is a high concentration of FGF21. The tumor response is an objective response rate (ORR), a clinical benefit rate (CBR), or % of maximum tumor shrinkage. In another embodiment, the pre-established cut-off value is an FGF21 protein concentration that is determined based on simulation models or percentile analysis predicting survival, and wherein a concentration of FGF21 protein below the pre-established cut-off value is a low concentration of FGF21 and a value equal to or higher than the pre-established cut-off value is a high concentration of FGF21. In this context, survival is progression free survival (PFS) or overall survival (OS). In some embodiments, ORR, CBR, or PFS and OS are defined by RECIST 1.1 Response Criteria, set forth in Eisenhauer, E. A. et al., Eur. J. Cancer 45:228-247 (2009).

In some embodiments, the method further includes communicating the test results to the subject's health care provider. In certain embodiments, the method further includes modifying the subject's medical record to indicate that the subject is responsive to or not responsive to a therapy comprising sorafenib or a pharmaceutically acceptable salt thereof. In specific embodiments, the record is created on a computer readable medium. In certain embodiments, the method further includes prescribing a therapy comprising an anti-tumor agent other than sorafenib or a pharmaceutically acceptable salt thereof for the subject if the baseline FGF21 expression profile is predictive that the subject is not responsive to a therapy comprising sorafenib or a pharmaceutically acceptable salt thereof. In certain embodiments, the method further includes prescribing a therapy comprising sorafenib or a pharmaceutically acceptable salt thereof for the subject if the baseline FGF21 expression profile is predictive that the subject is responsive to a therapy comprising sorafenib or a pharmaceutically acceptable salt thereof. In some embodiments, the method further includes administering to the subject a therapy comprising an anti-tumor agent other than sorafenib or a pharmaceutically acceptable salt thereof if the baseline FGP21 expression profile is predictive that the subject is not responsive to a therapy comprising sorafenib or a pharmaceutically acceptable salt thereof. In some embodiments, the method further includes administering to the subject a therapy comprising sorafenib or a pharmaceutically acceptable salt thereof if the baseline FGF21 expression profile is predictive that the subject is responsive to a therapy comprising sorafenib or a pharmaceutically acceptable salt thereof. In some embodiments, a medical practitioner can perform each step of obtaining and assaying a biological sample and measuring the expression level of FGF21, or the other health care provider can perform each of the steps under the medical practitioner's instruction.

In one embodiment, the concentration of FGF21 is measured by an immunological method. In some embodiments, the immunological method is selected from the group consisting of enzyme immunoassay, radioimmunoassay, chemiluminescent immunoassay, electrochemiluminescence immunoassay, latex turbidimetric immunoassay, latex photometric immunoassay, immuno-chromatographic assay, and western blotting. In another embodiment, the concentration of FGF21 is measured by enzyme immunoassay.

In a sixth aspect, the disclosure provides an FGF21 protein detection agent for use in predicting that a human subject having, suspected of having, or at risk of developing, a hepatocellular carcinoma is unlikely to respond to a therapy comprising sorafenib or a pharmaceutically acceptable salt thereof. In one embodiment, the FGF21 protein detection agent is an anti-FGF21 antibody.

In a seventh aspect, the disclosure features a kit comprising an FGF21 gene expression detection agent for use in predicting that a human subject having, suspected of having, or at risk of developing, a hepatocellular carcinoma is unlikely to respond to a therapy comprising sorafenib or a pharmaceutically acceptable salt thereof. In certain embodiments, the FGF21 gene expression detection agent is detectably-labeled-polynucleotide probes, complementary to the FGP21 mRNA. In certain embodiments, the FGF21 gene expression detection agent is an anti-FGF21 antibody. In certain embodiments, the anti-FGF21 antibody is a monoclonal antibody. In other embodiments, the anti-FGF21 antibody is a polyclonal antibody. In certain embodiments, the antibody is conjugated with a detectable agent. In one embodiment, the detectable agent is horse radish peroxidase, biotin, a fluorescent moiety, a radioactive moiety, a histidine tag, or a peptide tag. In one embodiment, the detectably labeled antibody is coated on a microplate. In certain embodiments, the microplate is a 96 well microplate. In certain embodiments, the kit optionally includes one or more concentration standards, one or more buffers (e.g., wash buffers), one or more diluents (e.g., assay and/or calibration diluents), and one or more reagents that facilitate detecting whether the FGF21 protein detection agent specifically binds FGF21 in a biological sample obtained from the subject (e.g., color reagents, stop solutions).

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the exemplary methods and materials are described below. All publications, patent applications, patents, and other references mentioned herein are incorporated by reference in their entirety. In case of conflict, the present application, including definitions, will control. The materials, methods, and examples are illustrative only and not intended to be limiting.

Other features and advantages of the invention will be apparent from the following detailed description, and from the claims.

BRIEF DESCRIPTION OF DRAWINGS

FIG. 1 shows tumor volume changes in mice with FGF21-TF (left) and Mock-TF (light) having treatment with LEN 10 mg/kg (open square), LEN 30 mg/kg (open triangle) and SOR 30 mg/kg (closed square) and no treatment (closed circle), respectively.

FIG. 2 shows relative body weight changes in mice with FGF21-TF (left) and Mock-TF (light) having treatment with LEN 10 mg/kg, LEN 30 mg/kg or SOR 30 mg/kg and no treatment respectively. The symbols for each group are same as those in FIG. 1.

FIG. 3 shows FGF21 protein expression in HCC PDx model (LI0334). A representative image taken by light microscopy is shown. Arrows show concentrated FGF21 staining.

FIG. 4 shows FGF21 Kaplan-Meier (K-M) curves of OS at the third quantile cutoff point for both arms. The solid and broken lines show low and high FGF21 groups, respectively.

DESCRIPTION OF EMBODIMENTS

This disclosure provides methods and compositions for identifying a hepatocellular carcinoma subject. (such as a human patient) responsive to a therapy comprising sorafenib or a pharmaceutically acceptable salt thereof (e.g., sorafenib tosylate). The disclosure provides FGF21 as a predictive biomarker to identify those subjects having, suspected of having, or at risk of developing, hepatocellular carcinoma (e.g., unresectable hepatocellular carcinoma) for whom administering a therapy comprising an anti-tumor agent other than sorafenib or a pharmaceutically acceptable salt thereof is recommended. The biomarkers, compositions, and methods described herein are useful in selecting appropriate therapeutic modalities (e.g., a therapy comprising sorafenib or a pharmaceutically acceptable salt thereof (e.g., sorafenib tosylate) or an alternative hepatocellular carcinoma therapy, e.g. an anti-tumor agent other than sorafenib or a pharmaceutically acceptable salt thereof) for subjects suffering from, suspected of having or at risk of developing hepatocellular carcinoma. Furthermore, the invention provides methods of selecting patients having, suspected of having, or at risk of developing, hepatocellular carcinoma that could not benefit from a therapy comprising sorafenib or a pharmaceutically acceptable salt thereof (e.g., sorafenib tosylate) as well as methods of treatment.

Definitions

The term "subject" means a mammal, including but not limited to, a human, a chimpanzee, an orangutan, a gorilla, a baboon, a monkey, a mouse, a rat, a pig, a horse, a dog, and a cow. In certain preferred embodiments, the subject is a human.

The term "sorafenib" refers to 4-[4-[[4-chloro-3-(trifluoromethyl)phenyl]carbamoylamino]phenoxy]-N-methylpyridine-2-carboxamide. Sorafenib and a pharmaceutically acceptable salt thereof (e.g. sorafenib tosylate (p-toluenesulfonic acid salt)) are disclosed in U.S. Pat. Nos. 7,235,576 and 7,351,834, which are incorporated by reference in their entirety herein. Sorafenib tosylate has been approved as NEXAVAR (registered trademark) by the U.S. Food and Drug Administration for the treatment of unresectable hepatocellular carcinoma, advanced renal cell carcinoma, and certain types of thyroid carcinoma.

The term "pharmaceutically acceptable salt" refers to a salt which possesses effectiveness similar to the parent compound and which is not biologically or otherwise undesirable (e.g., is neither toxic nor otherwise deleterious to the recipient thereof). As used herein, the term "pharmaceutically acceptable salt" is not particularly restricted as to the type of salt. Examples of such salts include, but are not limited to, inorganic acid addition salt such as hydrochloric acid salt, sulfuric acid salt, carbonic acid salt, bicarbonate salt, hydrobromic acid salt and hydriodic acid salt; organic carboxylic acid addition salt such as acetic acid salt, maleic acid salt, lactic acid salt, tartaric acid salt and trifluoroacetic acid salt; organic sulfonic acid addition salt such as methanesulfonic acid salt, hydroxyethanesulfonic acid salt, hydroxyethanesulfonic acid salt, benzenesulfonic acid salt, toluenesulfonic acid salt and taurine salt; amine addition salt such as trimethylamine salt, triethylamine salt, pyridine salt, procaine salt, picoline salt, dicyclohexylamine salt, N,N'-dibenzylethylenediamine salt, N-methylglucamine salt, diethanolamine salt, triethanolamine salt, tris(hydroxymethylamino)methane salt and phenethylbenzylamine salt; and amino acid addition salt such as arginine salt, lysine salt, serine salt, glycine salt, aspartic acid salt and glutamic acid salt.

The term "sorafenib compound" refers to "sorafenib or pharmaceutically acceptable salt thereof". Similar expressions, such as "lenvatinib compound" and "sunitinib compound" are to be interpreted as "lenvatinib or pharmaceutically acceptable salt thereof" and "sunitinib or pharmaceutically acceptable salt thereof".

The term "anti-tumor agent other than sorafenib or a pharmaceutically acceptable salt thereof" refers to any anti-tumor agent that is or can be used for treatment of hepatocellular carcinoma, e.g. chemotherapy, except a sorafenib compound. Such anti-tumor agents include but not limited to, a sunitinib compound, a brivanib compound, a linifanib compound, an erlotinib compound, a doxorubicin compound, a lenvatinib compound, a brivanib compound, an everolimus compound, ramucirumab, S-1, ADI-PEG20, a tivantinib compound, a regorafenib compound, a cabozantinib compound, an anti-CTLA-4 antibody (e.g. tremelimumab and ipilimumab), an anti-PD-1 antibody (e.g., nivolumab and pembrolizumab), an anti-PD-L1 antibody (e.g., durvalumab, avelumab, atezolizumab), which are disclosed in Ikeda et al. Jpn J Clin Oncol. 2018, 48(2) 103-114, which is incorporated by reference herein in its entirety.

The term "lenvatinib" refers to 4-(3-chloro-4-(cyclopropylaminocarbonyl)aminophenoxy)-7-methoxy-6-quinolinecarboxamide. This compound is disclosed in Example 368 (see, column 270) of U.S. Pat. No. 7,253,286. U.S. Pat. No. 7,253,286 is incorporated by reference in its entirety herein. The term "lenvatinib compound" refers to "lenvatinib or a pharmaceutically acceptable salt thereof." An example of a pharmaceutically acceptable salt of lenvatinib is lenvatinib mesylate (methanesulfonic acid salt) disclosed in U.S. Pat. No. 7,612,208, which is incorporated by reference herein in its entirety. Lenvatinib mesylate is also referred to as E7080. Lenvatinib mesylate has been approved as LENVIMA™ by the U.S. Food and Drug Administration for the treatment of patients with locally recurrent or metastatic, progressive, radioactive iodine-refractory differentiated thyroid cancer, unresectable hepatocellular carcinoma, or in combination with everolimus, for the treatment of patients with advanced renal cell carcinoma.

The term "protein" means any peptide-linked chain of amino acids, regardless of length or post-translational modification. Typically, a protein described herein is "isolated" when it constitutes at least 60%, by weight, of the total protein in a preparation, e.g., 60% of the total protein in a sample. In some embodiments, an isolated protein described herein consists of at least 75%, at least 90%, or at least 99%, by weight, of the total protein in a preparation.

The term "responds/responsive to a therapy" means that the subject administered with the therapy shows a positive response to the therapy provided. Non-limiting examples of such a positive response are: a decrease in tumor size, a decrease in metastasis of a tumor, or an increased period of survival after treatment.

The term "baseline level" of a protein in a sample from a subject means the concentration of that protein in the sample before administration of the subject with a therapy of sorafenib or a pharmaceutically acceptable salt thereof.

Fibroblast Growth Factor 21

Fibroblast growth factor 21 is a member of the fibroblast growth factor (FGF) family. FGF family members possess broad mitogenic and cell survival activities and are involved in a variety of biological processes. This protein is a secreted endocrine factor that functions as a major metabolic regulator. The encoded protein stimulates the uptake of glucose in adipose tissue.

Gene ID, related URL, protein ID and UniProtKB Accession No, of FGF21 are as follows:

Official Gene Symbol: FGF21
Gene ID: 26291
URL: www.ncbi.nlm.nih.gov/gene/26291
UniProtKB Accession No.: Q9NSA1

A high baseline level of FGF21 (e.g., protein or mRNA expression) compared to a control is indicative/predictive that a subject unlikely to respond to a therapy comprising sorafenib or a pharmaceutically acceptable salt thereof. For example, high concentrations (compared to a control) of baseline FGF21 protein in a biological sample obtained from a subject prior to treatment with the therapy are predictive that the subject is unlikely to respond to a therapy comprising sorafenib or a pharmaceutically acceptable salt thereof.

In certain embodiments, a subject is determined not to respond to a therapy comprising a sorafenib compound (e.g., sorafenib tosylate), if the subject does not show a partial response following treatment with the therapy. "Partial Response" means at least 30% decrease in the sum of the longest diameter (LD) of target lesions, taking as reference the baseline summed LD. In some embodiments, a subject is determined not to respond to a therapy comprising a sorafenib compound, if the subject does not show tumor shrinkage post-treatment with the therapy. "% of maximum tumor shrinkage" (MTS) means percent change of sum of diameters of target lesions, taking as reference the baseline sum diameters. In other embodiments, a subject is determined not to respond to a therapy comprising a sorafenib compound, if the subject does not show overall survival. "Overall Survival" (OS) refers to the time from randomization until death from any cause. "Randomization" means randomization of a patient into a test group or a control group when therapy plan for a patient is determined. In some embodiments, a subject is determined not to respond to a therapy comprising a sorafenib compound, if the subject does not show both overall survival and tumor shrinkage. In other embodiments, a subject is determined not to respond to a therapy comprising a sorafenib compound, if the subject does not show progression free survival. "Progression Free Survival" (PFS) refers to the time from the date of randomization to the date of first documentation of disease progression or death, whichever occurs first. In some embodiments, a subject is determined not to respond to a therapy comprising a sorafenib compound, if the subject does not show either progression free survival or tumor shrinkage.

This disclosure provides methods of identifying a subject having hepatocellular carcinoma who is less likely to have survival benefits (e.g., OS) following a therapy comprising a sorafenib compound (e.g., sorafenib tosylate) than a therapy comprising an anti-tumor agent other than a sorafenib compound. In this method, a biological sample of the subject, obtained prior to treatment with the therapy comprising a sorafenib compound, is assayed and the level of FGF21 protein is measured. A high concentration of the baseline FGF21 protein compared to a control indicates that the subject will less likely have survival benefits (e.g., OS) following therapy comprising a sorafenib compound than a therapy comprising an anti-tumor agent other than a sorafenib compound.

The concentration of FGF21 can be measured using any method known in the art such as an immunological assay. Non-limiting examples of such methods include enzyme immunoassay, radioimmunoassay, chemiluminescent immunoassay, electrochemiluminescence immunoassay, latex turbidimetric immunoassay, latex photometric immunoassay, immuno-chromatographic assay, and western blotting. In certain embodiments, the concentration of FGF21 is measured by enzyme immunoassay.

Controls

As described above, the methods of the present invention can involve measuring the baseline level of FGF21 in a biological sample from a subject having, suspected of having or at risk of developing hepatocellular carcinoma, wherein the expression level of FGF21, compared to a control, predicts that the subject is not responsive to (or cannot benefit from) a treatment comprising a sorafenib compound (e.g., sorafenib tosylate). In certain embodiments, when the concentration of baseline FGF21 in a biological sample from a subject having, suspected of having or at risk of developing hepatocellular carcinoma is higher than the control, the subject is identified as not responsive to a therapy comprising a sorafenib compound. In this context, the term "control" includes a sample (e.g., from the same tissue) obtained from a subject who is responsive to a therapy comprising a sorafenib compound (e.g., sorafenib tosylate). The term "control" also includes a sample (e.g., from the same tissue) obtained in the past from a subject who is known to be responsive to a therapy comprising a sorafenib compound and used as a reference for future comparisons to test samples taken from subjects for which necessity for the therapy is to be predicted.

In some embodiments, a "positive control" may be used instead of a "control." The "positive control" concentration for FGF21 in a particular cell type or tissue may alternatively be pre-established by an analysis of one or more subjects that have been identified as not responsive to a therapy comprising a sorafenib compound (e.g., sorafenib tosylate). This pre-established reference value (which may be an average or median expression level taken from multiple subjects that have been identified as not responsive to the therapy) may then be used as the "positive control" expression level in the comparison with the test sample. In such a comparison, the subject is predicted not to be responsive to a therapy comprising a sorafenib compound (e.g., sorafenib tosylate) if the concentration of FGF21 being analyzed is the same as, or comparable to (at least 85% but less than 100% of), the pre-established positive control reference.

In certain embodiments, the "control" is a pre-determined cut-off value.

Cut-Off Values

In some embodiments, the methods described herein include determining if the concentration of FGF21 falls above or below a predetermined cut-off value.

In accordance with the methods and compositions described herein, a reference concentration of baseline FGF21 is identified as a cut-off value, above or below of which is predictive of necessity for a therapy comprising a sorafenib compound (e.g., sorafenib tosylate). Some cut-off values are not absolute in that clinical correlations can still remain significant over a range of values on either side of the cutoff; however, it is possible to select an optimal cut-off value (e.g. varying H-scores) of concentration of FGF21 for a particular sample type. Cut-off values determined for use in the methods described herein can be compared with, e.g., published ranges of concentrations but can be individualized to the methodology used and patient population. It is understood that improvements in optimal cut-off values could be determined depending on the sophistication of statistical methods used and on the number and source of samples used to determine reference level values for the different sample types. Therefore, established cut-off values can be adjusted up or down, on the basis of periodic re-evaluations or changes in methodology or population distribution.

The reference concentration of FGF21 can be determined by a variety of methods. The reference level can be determined by comparison of the concentration of FGF21 in, e.g., populations of subjects (e.g., patients) that are responsive to a therapy comprising a sorafenib compound (e.g., sorafenib tosylate) or not responsive to a therapy comprising a sorafenib compound. This can be accomplished, for example, by histogram analysis, in which an entire cohort of patients is graphically presented, wherein a first axis represents the concentration of FGF21 and a second axis represents the number of subjects in the cohort whose sample contain one or more concentrations. Determination of the reference concentration of FGF21 can then be made based on an amount or concentration which best distinguishes these separate groups. The reference level can be a single number, equally applicable to every subject, or the reference level can vary, according to specific subpopulations of subjects. For example, older subjects can have a different reference level than younger subjects for the same cancer indication. In addition, a subject with more advanced disease (e.g., an unresectable hepatocellular carcinoma) can have a different reference value than one with a milder form of the disease.

The pre-established cut-off value can be a protein concentration that is determined based on receiver operating characteristic (ROC) analysis. ROC curves are used to determine a cut-off value for a clinical test. Consider the situation where there are two groups of patients and by using an established standard technique one group is known to be responsive to a therapy comprising a sorafenib compound, and the other is known to not be responsive to a therapy comprising a sorafenib compound. A measurement using a biological sample from all members of the two groups is used to test for the responsiveness to a therapy comprising a sorafenib compound. The test will find some, but not all, subjects that are not responsive to a therapy comprising a sorafenib compound. The ratio of the subjects not responsive to the therapy found by the test to the total number of the subjects not responsive to the therapy (known by the established standard technique) is the true positive rate (also known as sensitivity). The test will find some, but not all, the subjects responsive to a therapy comprising a sorafenib compound. The ratio of the subjects responsive to the therapy found by the test to the total number of the subjects responsive to the therapy (known by the established standard technique) is the true negative rate (also known as specificity). The hope is that the ROC curve analysis of the test above will find a cut-off value that will minimize the number of false positives and false negatives. An ROC is a graphical plot which illustrates the performance of a binary class stratifier system as its discrimination threshold is varied. It is created by plotting the fraction of true positives out of the positives versus the fraction of false positives out of the negatives, at various threshold settings.

In one embodiment, the concentration of FGF21 is determined based on ROC analysis predicting tumor response with a positive predictive value, wherein a concentration of FGF21 below the pre-established cut-off value is a low concentration of FGF21 and a value equal to or higher than the pre-established cut-off value is a high concentration of FGF21. The positive predictive value is the proportion of positive test results that are true positives, it reflects the probability that a positive test reflects the underlying condition being tested for. Methods of constructing ROC curves and determining positive predictive values are well known in the art. In certain embodiments, tumor response is an objective response rate (ORR), a clinical benefit rate (CBR) or % of maximum tumor shrinkage.

In another embodiment, the pre-established cut-off value can be a concentration of FGF21 that is determined based on simulation models predicting survival, and wherein a concentration of FGF21 below the pre-established cut-off value is a low concentration of FGF21 and a value equal to or higher than the pre-established cut-off value is a high concentration of FGF21. In some embodiments, survival is progression free survival (PFS). In other embodiments, survival is overall survival (OS).

In certain embodiments, the pre-established cut-off value for FGF21 protein is within a concentration range of 20th percentile to 80th percentile of populations of subjects. In some embodiments, the pre-established cut-off value may be within a concentration range of 20th percentile to 75th percentile, 25th percentile to 80th percentile, or 25th percentile to 75th percentile of populations of subjects. In some embodiments, the pre-established cut-off value may be median, first tertile, second tertile, first quantile, third quantile, first quintile, second quintile, third quintile, or forth quintile of populations of subjects.

In all of these embodiments, a concentration of FGF21 protein below the pre-established cut-off value is a low concentration of FGF21 and a value equal to or higher than the pre-established cut-off value is a high concentration of FGP21. In this context "about" means±10%.

Biological Samples

Suitable biological samples for the methods described herein include any biological fluid, cell, tissue, or fraction thereof, which contains FGF21 protein. A biological sample can be, for example, a specimen obtained from a subject (e.g., a mammal such as a human) or can be derived from such a subject. For example, a sample can be a tissue section obtained by biopsy, archived tumor tissue, or cells that are placed in or adapted to tissue culture. A biological sample can also be a biological fluid such as blood, plasma, serum, or such a sample absorbed onto a substrate (e.g., glass, polymer, paper). A biological sample can also include a hepatocellular carcinoma tissue sample. In specific embodiments, the biological sample is a tumor cell(s) or a tumor tissue obtained from a region of the subject suspected of containing a tumor or a precancerous lesion. For example, the biological sample may be a hepatocellular carcinoma tumor sample. A biological sample can be further fractionated, if desired, to a fraction containing particular cell types. For example, a blood sample can be fractionated into serum or into fractions containing particular types of blood cells such as red blood cells or white blood cells (leukocytes). If desired, a sample can be a combination of samples from a subject such as a combination of a tissue and fluid sample.

The biological samples can be obtained from a subject having, suspected of having, or at risk of developing, a hepatocellular carcinoma. In certain embodiments, the subject has advanced hepatocellular carcinoma. In other embodiments, the subject has an unresectable hepatocellular carcinoma.

Any suitable methods for obtaining the biological samples can be employed, although exemplary methods include, e.g., phlebotomy, fine needle aspirate biopsy procedure. Samples can also be collected, e.g., by microdissection (e.g., laser capture microdissection (LCM) or laser microdissection (LMD)).

Methods for obtaining and/or storing samples that preserve the activity or integrity of molecules (e.g., nucleic acids or proteins) in the sample are well known to those skilled in the art. For example, a biological sample can be further contacted with one or more additional agents such as buffers and/or inhibitors, including one or more of nuclease, protease, and phosphatase inhibitors, which preserve or minimize changes in the molecules (e.g., nucleic acids or proteins) in the sample. Such inhibitors include, for example, chelators such as ethylenediamine tetraacetic acid (EDTA), ethylene glycol bis(P-aminoethyl ether) N,N,N1,N1-tetraacetic acid (EGTA), protease inhibitors such as phenylmethylsulfonyl fluoride (PMSF), aprotinin, leupeptin, antipain, and the like, and phosphatase inhibitors such as phosphate, sodium fluoride, vanadate, and the like. Suitable buffers and conditions for isolating molecules are well known to those skilled in the art and can be varied depending, for example, on the type of molecule in the sample to be characterized (see, for example. Ausubel et al. Current Protocols in Molecular Biology (Supplement 47), John Wiley & Sons, New York (1999); Harlow and Lane, Antibodies: A Laboratory Manual (Cold Spring Harbor Laboratory Press (1988): Harlow and Lane, Using Antibodies: A Laboratory Manual. Cold Spring Harbor Press (1999); Tietz Textbook of Clinical Chemistry, 3rd ed. Burtis and Ashwood, eds. W.B. Saunders, Philadelphia, (1999). A sample also can be processed to eliminate or minimize the presence of interfering substances. For example, a biological sample can be fractionated or purified to remove one or more materials that are not of interest. Methods of fractionating or purifying a biological sample include, but are not limited to, chromatographic methods such as liquid chromatography, ion-exchange chromatography, size-exclusion chromatography, or affinity chromatography. For use in the methods described herein, a sample can be in a variety of physical states. For example, a sample can be a liquid or solid, can be dissolved or suspended in a liquid, can be in an emulsion or gel, or can be absorbed onto a material.

Determining Expression Levels/Concentrations of Biomarkers

Gene expression can be detected as, e.g., protein or RNA expression of a target gene. That is, the presence or expression level (amount) of a gene can be determined by detecting and/or measuring the level of mRNA or protein expression of the gene. In some embodiments, expression of FGF21 can be detected as the activity of FGF21 encoded by FGF21 gene.

A variety of suitable methods can be employed to detect and/or measure the level of mRNA expression of a gene. For example, mRNA expression can be determined using Northern blot or dot blot analysis, reverse transcriptase-PCR (RT-PCR; e.g., quantitative RT-PCR), in situ hybridization (e.g., quantitative in situ hybridization) or nucleic acid array (e.g., oligonucleotide arrays or gene chips) analysis. Details of such methods are described below and in, e.g., Sambrook et al., Molecular Cloning: A Laboratory Manual Second Edition vol. 1, 2 and 3. Cold Spring Harbor Laboratory Press: Cold Spring Harbor, New York, USA. November 1989: Gibson et al. (1999) Genome Res., 6(10):995-100i; and Zhang et al. (2005) Environ. Sci. Technol., 39(8):2777-2785; U.S. Publication No. 2004086915: European Patent No. 0543942; and U.S. Pat. No. 7,101,663; the disclosures of each of which are incorporated herein by reference in their entirety.

In one embodiment, the presence or amount of discrete populations of FGF21 mRNA populations in a biological sample can be determined by isolating total mRNA from the biological sample (see, e.g., Sambrook et al. (supra) and U.S. Pat. No. 6,812,341) and subjecting the isolated mRNA to agarose gel electrophoresis to separate the mRNA by size. The size-separated mRNAs are then transferred (e.g., by diffusion) to a solid support such as a nitrocellulose membrane. The presence or amount of FGF21 mRNA populations in the biological sample can then be determined using one or more detectably-labeled-polynucleotide probes, complementary to the mRNA sequence of interest, which bind to and thus render detectable their corresponding mRNA populations. Detectable-labels include, e.g., fluorescent (e.g., umbelliferone, fluorescein, fluorescein isothiocyanate, rhodamine, dichlorotriazinylamine fluorescein, dansyl chloride, allophycocyanin (APC), or phycoerythrin), luminescent (e.g., europium, terbium, Qdot™ nanoparticles supplied by the Quantum Dot Corporation. Palo Alto, CA), radiological (e.g., 125I, 131I, 35S, 32P, 33P, or 3H), and enzymatic (horseradish peroxidase, alkaline phosphatase, beta-galactosidase, or acetylcholinesterase) labels.

In another embodiment, the presence or amount of discrete populations of FGF21 mRNA in a biological sample can be determined using nucleic acid (or oligonucleotide) arrays (e.g., an array described below under "Arrays and Kits"). For example, isolated mRNA from a biological sample can be amplified using RT-PCR with, e.g., random hexamer or oligo(dT)-primer mediated first strand synthesis. The amplicons can be fragmented into shorter segments. The RT-PCR step can be used to detectably-label the amplicons, or, optionally, the amplicons can be detectably-labeled subsequent to the RT-PCR step. For example, the detectable-label can be enzymatically (e.g., by nick-translation or kinase such as T4 polynucleotide kinase) or chemically conjugated to the amplicons using any of a variety of suitable techniques (see, e.g., Sambrook et al., supra). The detectably-labeled-amplicons are then contacted with a plurality of polynucleotide probe sets, each set containing one or more of a polynucleotide (e.g., an oligonucleotide) probe specific for (and capable of binding to) a corresponding amplicon, and where the plurality contains many probe sets each corresponding to a different amplicon.

Generally, the probe sets are bound to a solid support and the position of each probe set is predetermined on the solid support. The binding of a detectably-labeled amplicon to a corresponding probe of a probe set indicates the presence or amount of a target mRNA in the biological sample. Additional methods for detecting mRNA expression using nucleic acid arrays are described in, e.g., U.S. Pat. Nos. 5,445,934; 6,027,880; 6,057,100; 6,156,501; 6,261,776; and 6,576,424; the disclosures of each of which are incorporated herein by reference in their entirety.

Methods of detecting and/or for quantifying a detectable label depend on the nature of the label. The products of reactions catalyzed by appropriate enzymes (where the detectable label is an enzyme; see above) can be, without limitation, fluorescent, luminescent, or radioactive or they may absorb visible or ultraviolet light. Examples of detectors suitable for detecting such detectable labels include, without limitation, x-ray film, radioactivity counters, scintillation counters, spectrophotometers, colorimeters, fluorometers, luminometers, and densitometers.

In one embodiment, the expression of FGF21 is determined by detecting and/or measuring expression or concentration of FGF21 encoded by the FGF21 gene. Methods of determining protein expression/concentration are well known in the art. A generally used method involves the use of antibodies specific for the target protein of interest. For example, methods of determining protein expression include, but are not limited to, western blot or dot blot analysis, immunohistochemistry (e.g., quantitative immunohistochemistry), immunocytochemistry, enzyme-linked immunosorbent assay (ELISA), enzyme-linked immunosorbent spot (ELISPOT; Coligan, J. E., et al., eds. (1995) Current Protocols in Immunology. Wiley, New York), radio-immunoassay, chemiluminescent immunoassay, electrochemiluminescence immunoassay, latex turbidimetric immunoassay, latex photometric immunoassay, immunochromatographic assay, and antibody array analysis (see, e.g., U.S. Publication Nos. 20030013208 and 2004171068, the disclosures of each of which are incorporated herein by reference in their entirety). Further description of many of the methods above and additional methods for detecting protein expression can be found in, e.g., Sambrook et al. (supra).

In one example, the presence or amount of expression of FGF21 is determined using a western blotting technique. For example, a lysate can be prepared from a biological sample, or the biological sample itself, can be contacted with Laemmli buffer and subjected to sodium-dodecyl sulfate polyacrylamide gel electrophoresis (SDS-PAGE). SDS-PAGE-resolved proteins, separated by size, can then be transferred to a filter membrane (e.g., nitrocellulose) and subjected to immunoblotting techniques using a detectably-labeled antibody specific to FGF21. The presence or amount of bound detectably-labeled antibody indicates the presence or amount of protein in the biological sample.

In another example, an immunoassay is used for detecting and/or measuring the protein expression of FGF21. As above, for the purposes of detection, an immunoassay can be performed with an antibody that bears a detection moiety (e.g., a fluorescent agent or enzyme). Proteins from a biological sample can be conjugated directly to a solid-phase matrix (e.g., a multi-well assay plate, nitrocellulose, agarose, sepharose, encoded particles, or magnetic beads) or it can be conjugated to a first member of a specific binding pair (e.g., biotin or streptavidin) that attaches to a solid-phase matrix upon binding to a second member of the specific binding pair (e.g., streptavidin or biotin). Such attachment to a solid-phase matrix allows the proteins to be purified away from other interfering or irrelevant components of the biological sample prior to contact with the detection antibody and also allows for subsequent washing of unbound antibody. Here as above, the presence or amount of bound detectably-labeled antibody indicates the presence or amount of protein in the biological sample.

There is no particular restriction as to the form of the antibody and the present disclosure includes polyclonal antibodies, as well as monoclonal antibodies. The antiserum obtained by immunizing animals such as rabbits with FGF21 or fragment thereof, as well polyclonal and monoclonal antibodies of all classes, human antibodies, and humanized antibodies produced by genetic recombination, are also included.

An intact protein or its partial peptide may be used as the antigen for immunization. As partial peptides of the proteins, for example, the amino (N)-terminal fragment of the protein and the carboxy (C)-terminal fragment can be given.

A gene encoding FGF21 or a fragment thereof (e.g., an immunological fragment) is inserted into a known expression vector, and, by transforming the host cells with the vector described herein, the desired protein or a fragment thereof is recovered from outside or inside the host cells using standard methods. This protein can be used as the sensitizing antigen. Also, cells expressing the protein, cell lysates, or a chemically synthesized protein of the invention may be also used as a sensitizing antigen.

The mammal that is immunized by the sensitizing antigen is not restricted; however, it is preferable to select animals by considering the compatibility with the parent cells used in cell fusion. Generally, animals belonging to the orders rodentia, lagomorpha, or primates are used. Examples of animals belonging to the order of rodentia that may be used include, for example, mice, rats, and hamsters. Examples of animals belonging to the order of lagomorpha that may be used include rabbits. Examples of animals belonging to the order of primates that may be used include monkeys. Examples of monkeys to be used include the infraorder catarrhini (old world monkeys), for example, *Macaca fascicularis*, rhesus monkeys, sacred baboons, and chimpanzees.

Moreover, the antibody used in methods of the present disclosure may be an antibody fragment or modified-antibody, so long as it binds to FGF21. For instance, Fab, F (ab') 2, Fv, or single chain Fv (scFv) in which the H chain Fv and the L chain Fv are suitably linked by a linker (Huston et al., Proc. Natl. Acad. Sci. USA, 85:5879-5883, (1988)) can be given as antibody fragments.

The antibodies may be conjugated to various molecules, such as fluorescent substances, radioactive substances, and luminescent substances. Methods to attach such moieties to an antibody are already established and conventional in the field (see. e.g., U.S. Pat. Nos. 5,057,313 and 5,156,840).

Examples of methods that assay the antigen-binding activity of the antibodies include, for example, measurement of absorbance, enzyme-linked immunosorbent assay (ELISA), enzyme immunoassay (EIA), radioimmunoassay (RIA), and/or immunofluorescence. For example, when using ELISA, a protein encoded by a biomarker of the invention is added to a plate coated with the antibodies of the present disclosure, and then, the antibody sample, for example, culture supernatants of antibody-producing cells, or purified antibodies are added. Then, secondary antibody recognizing the primary antibody, which is labeled by alkaline phosphatase and such enzymes, is added, the plate is incubated and washed, and the absorbance is measured to evaluate the antigen-binding activity after adding an enzyme substrate such as p-nitrophenyl phosphate. As the protein, a protein fragment, for example, a fragment comprising a C-terminus, or a fragment comprising an N-terminus may be used. To evaluate the activity of the antibody of the invention, BIAcore (GE Healthcare) may be used.

By using these methods, an antibody used in methods of the invention and a sample presumed to contain FGF21 are contacted, and FGF21 is detected or assayed by detecting or assaying the immune complex formed between the above-mentioned antibody and the protein.

Mass spectrometry based quantitation assay methods, for example, but not limited to, multiple reaction monitoring (MRM)-based approaches in combination with stable-isotope labeled internal standards, are an alternative to immunoassays for quantitative measurement of proteins. These approaches do not require the use of antibodies and so the analysis can be performed in a cost- and time-efficient manner (see, for example, Addona et al., Nat. Biotechnol., 27:633-641, 2009; Kuzyk et al., Mol. Cell Proteomics, 8:1860-1877, 2009; Paulovich et al., Proteomics Clin. Appl., 2:1386-1402, 2008). In addition, MRM offers superior multiplexing capabilities, allowing for the simultaneous quantification of numerous proteins in parallel. The basic theory of these methods has been well-established and widely utilized for drug metabolism and pharmacokinetics analysis of small molecules.

Creating a Response Profile

The methods described herein can also be used to generate a response profile for a subject having hepatocellular carcinoma about a therapy comprising a sorafenib compound (e.g., sorafenib tosylate). The profile can include, e.g., information that indicates the baseline expression level of FGF21 before the treatment with sorafenib or a pharmaceutically acceptable salt thereof; and/or the histological analysis of any hepatocellular carcinoma. The resultant information (sorafenib therapy response profile) can be used for predicting that a subject (e.g., a human patient) having, suspected of having or at risk of developing hepatocellular carcinoma is not responsive to a therapy comprising a sorafenib compound (e.g., sorafenib tosylate).

It is understood that a sorafenib compound (e.g., sorafenib tosylate) response profile can be in electronic form (e.g., an electronic patient record stored on a computer or other electronic (computer-readable) media such as a DVD, CD, or floppy disk) or written form. The sorafenib compound (e.g., sorafenib tosylate) response profile can also include information for several (e.g., two, three, four, five, 10, 20, 30, 50, or 100 or more) subjects (e.g., human patients). Such multi-subject response profiles can be used, e.g., in analyses (e.g., statistical analyses) of particular characteristics of subject cohorts.

Responsiveness of a subject to a therapy comprising sorafenib or a pharmaceutically acceptable salt thereof (e.g., sorafenib tosylate) can be classified in several ways and classification is dependent on the subject's disease, the severity of the disease, and the particular medicament the subject is administered. In the simplest sense, responsiveness is any decrease in the disease state as compared to pre-treatment, and non-responsiveness is the lack of any change in the disease state as compared to pre-treatment. Responsiveness of a subject (e.g., a human) with a hepatocellular carcinoma can be classified based on one or more of a number of objective clinical indicia such as, but not limited to, tumor size, Clinical Benefit (CB). Progression Free Survival (PFS). Overall Survival (OS), % of Maximum tTmor Shrinkage (MTS), or Objective Response Rate (ORR). In some embodiments, CB, PFS, OS and ORR are defined by RECIST 1.1 Response Criteria, set forth in Eisenhauer, E. A, et al., Eur. J. Cancer 45:228-247 (2009).

"Clinical benefit" refers to having one of the following statuses—Complete Response (CR), Partial Response (PR); or Stable Disease (SD) with 6 months or more progression free survival (PFS). "Complete Response" means complete disappearance of all target lesions. "Partial Response" means at least 30% decrease in the sum of the longest diameter (LD) of target lesions, taking as reference the baseline summed LD. "Progressive Disease" (PD) means at least 20% increase in the sum of the LD of target lesions, taking as reference the smallest summed LD recorded since the treatment started, or the appearance of one or more new lesions. "Stable Disease" means neither sufficient shrinkage of the target lesions to qualify for PR nor sufficient increase to qualify for PD, taking as reference the smallest summed LD since the treatment started.

"Overall Survival" (OS) is defined as the time from randomization until death from any cause. "Randomization" means randomization of a patient into a test group or a control group when therapy plan for a patient is determined.

"Progression Free Survival" (PFS) refers to the time from the date of randomization to the date of first documentation of disease progression or death, whichever occurs first.

"% of Maximum Tumor shrinkage" MTS) means percent change of sum of diameters of target lesions, taking as reference the baseline sum diameters.

"Objective Response Rate" (ORR) compares subjects with either Complete Response (CR) or Partial Response (PR) with subjects with either Stable Disease (SD) or Progressive Disease (PD).

Kits

The invention also provides kits. In certain embodiments, the kit can include an antibody or antibodies that can be used to detect FGF21 or its concentration or expression levels. The antibodies in the kit may be monoclonal or polyclonal and can be further conjugated with a detectable label. The kits can optionally contain instructions for detecting and/or measuring the concentration of FGF21 in a biological sample.

The kits can optionally include, e.g., a control (e.g., a concentration standard for FGF21 protein). In some instances, the control can be an insert (e.g., a paper insert or electronic medium such as a CD. DVD, or floppy disk) containing an expression level or expression level ranges of FGF21 predictive of a necessity for a therapy comprising a sorafenib compound (e.g., sorafenib tosylate).

In some embodiments, the kits can include one or more reagents for processing a biological sample (e.g., calibration reagents, buffers, diluents, color reagents, reagents to stop a reaction). For example, a kit can include reagents for isolating a protein from a biological sample and/or reagents for detecting the presence and/or amount of FGF21 in a biological sample (e.g., an antibody that binds to FGF21 and/or an antibody that binds the antibody that binds to FGF21).

In certain embodiments, the kit includes at least one microplate (e.g., a 96 well plate; i.e., 12 strips of 8 wells). The microplate can be provided with its corresponding plate cover. The microplate can be polystyrene or of any other suitable material. The microplate can have an antibody that is used to identify the presence of FGF21 coated inside each well. The antibody may be conjugated to a detectable label. The kit may also include at least one adhesive strip.

In some embodiments, the kit can include a software package for analyzing the results of, e.g., expression profile or a microarray analysis.

The kits described herein can also optionally include instructions for administering a therapy comprising a treatment other than a sorafenib compound, where the concentration of FGF21 predicts that a subject having, suspected of having or at risk of developing hepatocellular carcinoma is not responsive to a therapy comprising a sorafenib compound (e.g., sorafenib tosylate).

The following are examples of the practice of the invention. They are not to be construed as limiting the scope of the invention in any way.

EXAMPLE

Example 1. Expression Patterns of FGF Ligands and their Receptors in HCC Cell Lines and Patients Methods: In order to assess FGF-related gene expressions in hepatocellular carcinoma (MCC), we collected gene expression data from two public databases: The Cancer Genome Atlas (TCGA) and The Cancer Cell Line Encyclopedia (CCLE).

TCGA LIHC Dataset (LIHC Patient Cohort)

Gene expression data measured by RNA-seq (Illumina HiSeq) was downloaded from UCSC Xena hub website (Dataset ID: TCGA.LIHC.sampleMap/HiSeqV2). This dataset contains expression levels of 20,531 genes×423 LIHC (liver hepatocellular carcinoma) samples; expression levels are represented as log 2 RSEM normalized count. Of the 423 samples, 368 samples derived from primary tumor site of HCC patients were used for evaluating FGF-related gene expressions; 55 samples eliminated from analysis were taken from non-primary tumor site or from non-HCC patients. The proportions of patients with expression level>0 were calculated for each of the seven FGF-related genes: FGF19, FGF21, FGFR1 (fibroblast growth factor receptor 1), FGFR2. FGFR3, FGFR4 and KLB (Klotho Beta).

CCLE LIHC Dataset (Human Cell Lines)

Gene expression data measured by RNA-seq (Illumina HiSeq) was obtained from NCI (National Cancer Institute) CTD2 data portal website (Translational Genomics Research Institute (TGen): Quantified Cancer Cell Line Encyclopedia (CCLE) RNA-seq Data). This dataset contains expression levels of 55,874 genes×936 cancer cell lines: expression levels is represented as TPM (Transcripts per Million). Of those, 32 LIHC cell lines were selected and subjected to analysis.

Results: Analysis of the TCGA database showed that FGF21, FGFR1-4 and FGFR coreceptor KLB were expressed in almost all HCC patients (FGF21, 97%; FGFR1-4, 100/99/100/100%; KLB, 100%). However, FGF21 expression was below detection levels in all HCC cell lines in the CCLE data base.

Example 2. Antitumor Activities of Lenvatinib and Sorafenib in FGF21 Expressing HCC Tumor Cell Lines and PDX Tumor Xenograft Models in Mice Methods: Human FGF21 and Mock-transfected HCC PLC/PRF/5 cells (FGF21-TF and Mock-TF, respectively) were established by using piggy-back system. To evaluate antitumor activity against these tumors, 4.2×106 cells of FGF21-TF or 4.3×106 cells of Mock-TF were subcutaneously injected into female nude mice (Charles River, Japan) with matrigel (BD Biosciences). When tumor volumes reached approximately 200-300 mm3, mice were divided into each group according to their tumor volumes and either lenvatinib mesylate (abbreviated as LEN) (10 mg/kg and 30 mg/kg) or Sorafenib tosylate (abbreviated as SOR) (30 mg/kg) was orally administered once daily. Follow-up analysis of a HCC patient-derived xenograft (PDX)-derived tumor (LI0334 HCC PDX tumor model treated with 3 mM HCl (vehicle for lenvatinib)) assessed FGF21 expression levels by immunohistochemistry. Three μm thick sections of paraffin-embedded tumor samples were de-paraffinized and hydrated. Antigen retrieval was performed by incubation of the samples in Dako REAL Target Retrieval sol. (pH6.0) (Dako) for 30 minutes. Endogenous hydrogen peroxidase activity was blocked by incubating the slides for 10 min with 3% hydrogen peroxide. The slides were incubated overnight with primary antibody, human rabbit anti-human FGF21 (ab64857. Abcam) at 1:100 in 1% BSA/PBS at 4° C. The slides were washed and incubated with EnVision+Single Reagents/Rabbit HRP (horseradish peroxidase) (Dako cat #K4002) for 30 minutes at room temperature. HRP activity was visualized by DAB and the slides were counterstained with Haematoxylin (New Haematoxylin type G, Muto Pure Chemicals) and mounted with coverslips. The slides were photographed digitally by light microscopy.

Results: Although both LEN and SOR showed antitumor activity in the Mock-TF model, only LEN showed activity in the FGP21-TF model (FIG. 1). Neither treatment exacerbated body weight losses associated with tumor presence compared to non-treatment conditions (FIG. 2). The LI0334 HCC PDX tumor model to be inhibited by LEN but not SOR (for example, reported in Matsuki, et. al., Proceedings of the American Association for Cancer Research Annual Meeting 2017; 2017 Apr. 1-5; Washington, DC.: AACR; Cancer Res 2017; 77 (0.13 Suppl): Abstract nr 1805), was found by immunohistochemical (IHC) analysis to highly express FGP21 (FIG. 3).

LEN showed antitumor activity against preclinical HCC tumor models with or without high FGF21 expression, while SOR only showed antitumor activity against HCC models without high FGF21 levels.

Example 3. Biomarker Analysis in Subjects with Hepatocellular Carcinoma by Lenvatinib or Sorafenib Objectives:

The objective of the biomarker analysis was to identify blood or tumor biomarkers that may be useful to predict subject response to lenvatinib as determined by evaluation of primary or secondary efficacy endpoints. To explore potential predictive biomarkers, interaction analysis with biomarkers, lenvatinib/sorafenib arm and their interaction term was conducted.

Method:

E7080-G000-304 was a multicenter, randomized, open-label, noninferiority Phase 3 study to compare the efficacy and safety of lenvatinib versus sorafenib as a first-line systemic treatment in subjects with unresectable HCC. Subjects were randomly assigned in a 1:1 ratio to treatment with either lenvatinib 12 mg (baseline body weight [BW]≥60 kg) or 8 mg (baseline BW<60 kg) given once daily (QD) orally or sorafenib 400 mg given twice daily (BID) orally. Subjects were stratified by region, presence or absence of macroscopic portal vein invasion (MPVI) or extrahepatic spread (EHS) or both, Eastern Cooperative Oncology Group Performance Status (ECOG PS) 0 or 1, and BW (<60 kg or ≥60 kg). A total of 951 subjects (476 lenvatinib; 475 sorafenib) were enrolled and treated. Lenvatinib and sorafenib were self-administered by the subjects orally, at the same time each day (consistently either with or without food) in continuous 28-day cycles. Subjects received study treatment until disease progression, development of unacceptable toxicity, subject request, or withdrawal of consent.

Of the 954 subjects enrolled in the clinical study and assigned to receive lenvatinib or sorafenib, 407 subjects (42.7% of all ITT subjects, lenvatinib arm, n=279 and sorafenib arm, n=128) were included in blood serum biomarker assay.

Serum samples were collected at Day 1 of Cycle1 (pre-treatment). The serum levels of FGF21 at Day 1 of Cycle 1 (baseline level) in Samples from 279 subjects in the lenvatinib arm and 128 subjects in the sorafenib arm (total 407 subjects) were determined by enzyme-linked immunosorbent assay (ELISA). All biomarker data were transferred to study data tabulation model (SDTM) in accordance with the data transfer specification developed separately. Correlation between the serum baseline level of FGF21 and clinical outcome, such as progression free survival (PFS) was assessed. PFS was defined as the time from the date of randomization to the date of first documentation of disease progression or death.

Statistical Methods

All statistical analyses were performed by the Clinical Data Science department at Eisai Co., Ltd. (Tokyo, Japan) after the clinical study was completed and a snapshot of the database was obtained on 13 Nov. 2016. For the correlation analyses with PFS, data sets based on independent imaging review (IIR) by RECIST 1.1 were used. Statistical analyses were performed using SAS version 9.3.

Baseline Blood Serum Biomarker Correlation Analysis

For each baseline level of blood serum biomarker, correlation analysis with survival outcome measures (OS and PFS) was performed using univariate Cox regression for the lenvatinib arm and the sorafenib arm separately.

Baseline Serum Biomarker Cutoff Analysis

Subjects were divided into two high-low groups based on the baseline level of each blood serum biomarker. The cutoff point was third quartile. Association between the groups and survival outcome measures (OS and PFS) was explored using univariate Cox regression and the Log-rank test with the selected cutoff points.

Correlation Between Baseline Serum FGF21 Level and OS

Dichotomized analysis showed that high baseline FGF21 levels were associated with shortened survival at the third quantile cutoff point in both arms. Median OS for high FGF21 group (median OS=10.9 months, 95% CI: 8.2 to 13.1) was shorter than that of low FGF21 group (median OS=18.0 months, 95% CI: 14.1 to 20.9) in the lenvatinib arm (HR=1.745 [95% CI: 1.266 to 2.406], P value=0.0006, Table 1). In the sorafenib arm, median OS for low and high group (cutoff point: third quartile) was 17.8 months (95% CI: 13.7 to 22.9) and 6.8 months (95% CI: 4.6 to 10.3), respectively (HR=3.341 [95% CI: 2.081 to 5.365], P value<0.0×001, Table 2). FGF21 K-M curves of OS at the third quantile cutoff point for both arms are in FIG. 4. Multivariate Cox regression analysis with treatment arm, baseline level and its interaction demonstrated a significant interaction at the third quantile cutoff point (Pinteraction value=0.0397). HR: Hazard ratio, CI: Confidence interval, MST: Median survival time.

These results indicated that high baseline serum FGF21 level was associated with shorter OS in both arms. However, the HR in the lenvatinib arm (HR=1.745) was lower than that in the sorafenib arm (HR=3.341) and there was a significant interaction between lenvatinib and sorafenib (Pinteraction value=0.0397). These data suggest that high FGF21 level is a potential predictive biomarker for shorter OS in the sorafenib arm as compared with the lenvatinib arm.

Correlation Between Baseline Serum FGF21 Level and PFS

Dichotomized analysis of baseline serum FGF21 level demonstrated no clear difference of PFS (RECIST 1.1) between high and low baseline groups with at the third quantile cutoff point in the lenvatinib arm (Tables 3). In the sorafenib arm, baseline serum FGF21 level estimated short median PFS (RECIST 1.1) for high group than that of low group in the third quartile cutoff point (Tables 4).

TABLE 1

Cutoff analysis of FGF21 baseline levels with OS in the lenvatinib arm

| | | | Lenvatinib | | | | | |
| --- | --- | --- | --- | --- | --- | --- | --- | --- |
| | Cutoff | | Low | | High | | Log-Rank | |
| Marker | Quantile | Value | N | MST | N | MST | P value | HR (95% CI) |
| FGF21 | 0.75 | 688 ng/L | 191 | 18.0 | 70 | 10.9 | 0.0006 | 1.745 (1.266, 2.406) |

TABLE 2

Cutoff analysis of FGF21 baseline levels with OS in the sorafenib arm

| | | | Sorafenib | | | | | |
|---|---|---|---|---|---|---|---|---|
| | Cutoff | | Low | | High | | Log-Rank | |
| Marker | Quantile | Value | N | MST | N | MST | P value | HR (95% CI) |
| FGF21 | 0.75 | 688 ng/L | 99 | 17.8 | 27 | 6.8 | <0.0001 | 3.341 (2.081, 5.365) |

TABLE 3

Cutoff analysis of FGF21 baseline levels with PFS in the lenvatinib arm

| | | | Lenvatinib | | | | | |
|---|---|---|---|---|---|---|---|---|
| | Cutoff | | Low | | High | | Log-Rank | |
| Marker | Quantile | Value | N | MST | N | MST | P value | HR (95% CI) |
| FGF21 | 0.75 | 688 ng/L | 191 | 8.0 | 70 | 7.5 | 0.3569 | 1.184 (0.826, 1.697) |

TABLE 4

Cutoff analysis of FGF21 baseline levels with PFS in the sorafenib arm

| | | | Sorafenib | | | | | |
|---|---|---|---|---|---|---|---|---|
| | Cutoff | | Low | | High | | Log-Rank | |
| Marker | Quantile | Value | N | MST | N | MST | P value | HR (95% CI) |
| FGF21 | 0.75 | 688 ng/L | 99 | 5.5 | 27 | 2.4 | 0.0320 | 1.783 (1.041, 3.055) |

SPECIFIC EMBODIMENTS

Specific embodiments of the invention are as follows:

1. A method of predicting the response of a human subject having, suspected of having, or at risk of developing a hepatocellular carcinoma to a therapy comprising sorafenib or a pharmaceutically acceptable salt thereof, the method comprising measuring or having measured a baseline expression level of fibroblast growth factor 21 (FGF21) in a biological sample obtained from the human subject, wherein a high baseline expression level of FGF21, as compared to a control, is predictive that the human subject will not be responsive to the therapy comprising sorafenib or a pharmaceutically acceptable salt thereof.

2. The method of embodiment 1, further comprising administering to the human subject a therapy comprising an anti-tumor agent other than sorafenib or a pharmaceutically acceptable salt thereof.

3. A method of treating a human subject having, suspected of having, or at risk of developing a hepatocellular carcinoma, comprising administering to the human subject a therapy comprising an anti-tumor agent other than sorafenib or a pharmaceutically acceptable salt thereof, wherein the human subject has a baseline expression level of FGF21, in a biological sample obtained from the human subject, that is higher than a control.

4. A method of treating a human subject having, suspected of having, or at risk of developing a hepatocellular carcinoma, comprising:
measuring or having measured in a biological sample obtained from the human subject a baseline expression level of FGP21 that is high as compared to a control; and administering to the human subject a therapy comprising an anti-tumor agent other than sorafenib or a pharmaceutically acceptable salt thereof.

5. The method of any one of embodiments 1 to 4, wherein the biological sample is a blood sample, a serum sample, or a plasma sample.

6. The method of any one of embodiments 1 to 5, wherein the baseline expression level of FGF21 is measured based on an amount of mRNA encoding FGF21.

7. The method of any one of embodiments 1 to 5, wherein the baseline expression level of FGF21 is measured based on an amount of FGF21 protein.

8. The method of any one of embodiments 1 to 7, wherein the pharmaceutically acceptable salt of sorafenib is sorafenib tosylate.

9. The method of any one of embodiments 1 to 8, wherein the hepatocellular carcinoma is unresectable hepatocellular carcinoma.

10. The method of any one of embodiments 2 to 9, wherein the anti-tumor agent other than sorafenib or a pharmaceutically acceptable salt thereof is lenvatinib or a pharmaceutically acceptable salt thereof.

11. The method of any one of embodiments 2 to 9, wherein the anti-tumor agent other than sorafenib or a pharmaceutically acceptable salt thereof is lenvatinib mesylate.

OTHER EMBODIMENTS

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A method of treating a human subject having a hepatocellular carcinoma, comprising administering to the human subject a therapy comprising an anti-tumor agent, wherein the human subject has a baseline expression level of FGF21, in a biological sample obtained from the human subject, that is higher than a control, wherein the anti-tumor agent is lenvatinib or a pharmaceutically acceptable salt thereof, and wherein the control corresponds to a baseline expression level of FGF21 obtained from a subject that has hepatocellular carcinoma and is known to be responsive to a therapy comprising a sorafenib compound.

2. A method of treating a human subject having a hepatocellular carcinoma, comprising:
measuring or having measured in a biological sample obtained from the human subject a baseline expression level of FGF21 that is high as compared to a control, wherein the control corresponds to a baseline expression level of FGF21 obtained from a subject that has hepatocellular carcinoma and is known to be responsive to a therapy comprising a sorafenib compound; and
administering to the human subject a therapy comprising an anti-tumor agent, wherein the anti-tumor agent is lenvatinib or a pharmaceutically acceptable salt thereof.

3. The method of claim 1, wherein the biological sample is a blood sample, a serum sample, or a plasma sample.

4. The method of claim 1, wherein the baseline expression level of FGF21 is measured by measuring the amount of mRNA encoding FGF21 in the biological sample.

5. The method of claim 1, wherein the baseline expression level of FGF21 is measured by measuring the amount of FGF21 protein in the biological sample.

6. The method of claim 1, wherein the hepatocellular carcinoma is unresectable hepatocellular carcinoma.

7. The method of claim 1, wherein the anti-tumor agent is lenvatinib mesylate.

8. The method of claim 2, wherein the biological sample is a blood sample, a serum sample, or a plasma sample.

9. The method of claim 2, wherein the baseline expression level of FGF21 is measured by measuring the amount of mRNA encoding FGF21 in the biological sample.

10. The method of claim 2, wherein the baseline expression level of FGF21 is measured by measuring the amount of FGF21 protein in the biological sample.

11. The method of claim 2, wherein the hepatocellular carcinoma is unresectable hepatocellular carcinoma.

12. The method of claim 2, wherein the anti-tumor agent is lenvatinib mesylate.

* * * * *